March 3, 1964

W. G. PFANN ETAL 3,123,788

PIEZORESISTIVE GAGE

Filed April 25, 1961

INVENTORS: W. G. PFANN
R. N. THURSTON

BY:

ATTORNEY

March 3, 1964 W. G. PFANN ETAL 3,123,788
PIEZORESISTIVE GAGE
Filed April 25, 1961 2 Sheets-Sheet 2

INVENTORS: W. G. PFANN
R. N. THURSTON
BY:
ATTORNEY 3,123,788
PIEZORESISTIVE GAGE
William G. Pfann, Far Hills, and Robert N. Thurston, Whippany, N.J., assignors to Bell Telephone Laboratories, Incorporated, New York, N.Y., a corporation of New York
Filed Apr. 25, 1961, Ser. No. 105,355
9 Claims. (Cl. 338—4)

This invention relates to piezoresistive semi-conductor stress gages. More particularly, it concerns a single novel piezoresistive gage configuration adapted to provide a complete determination of biaxial strains in a given member.

In the current practice of biaxial stress or strain measurement, three separate metal foil gages, termed a rosette, are required. The present invention proposes a single, semiconductor gage of simple design to more conveniently achieve the same end with even greater sensitivity.

The specific gage construction of this invention comprises a flat wafer of a semiconductive piezoresistive material having a thickness preferably less than one-tenth of the minimum remaining normal dimension. The shape of the gage is not of consequence as long as the remaining requirements set forth are met. The gage further includes four electrical contacts spaced over one flat surface, and disposed at essentially the corners of a square. These contacts are preferably spaced such that imaginary lines connecting each opposing pair are normal to each other within ten degrees.

As is well known in the art, to obtain a complete determination of biaxial strains or stresses at least three measurements are essential, thus the art has adopted a three gage rosette. Using the gage of the present invention, three measurements are also obtained, but all three are taken in a single piezoresistive semiconductor wafer. These measurements are taken between various of the four contacts disposed on the single wafer as hereinafter prescribed.

The gage construction of this invention will be better understood when considered with the drawings in which.

Figure 1:
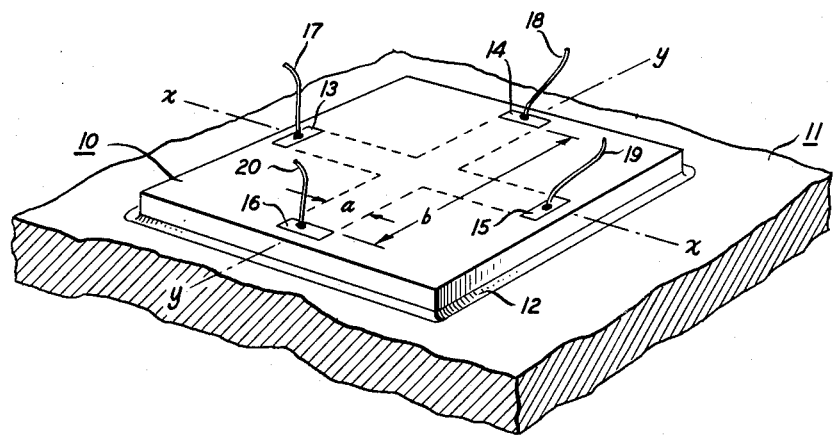
FIG. 1 is a perspective view of a general gage form of this invention.

FIG. 1 shows a piezoresistive semiconductor wafer 10 affixed to member 11 in which stresses are to be measured. The adhesive 12 is an insulating type glue such as Allen PBX cement. Four electrical contacts 13, 14, 15 and 16 are disposed across the surface of the wafer 10 essentially as shown. As previously discussed, the imaginary center lines $x$—$x$ and $y$—$y$ joining the projected centers of each contact should be normal to one another within ten degrees. To insure the proper current flow and piezoresistive response the ratio of $a$ (FIG. 1), which is the projected width of the contact in the $y$—$y$ direction is preferably approximately equal to one-third $b$ (FIG. 1) which is the distance separating the leading edges of the opposing pair of contacts. To obtain proper current flow, the ratio of dimensions $a$ to $b$ should not significantly depart from the range 1:2 to 1:20. Above this range excessive shorting occurs, while below this range spreading of the current flow becomes significant.

Figure 1A:
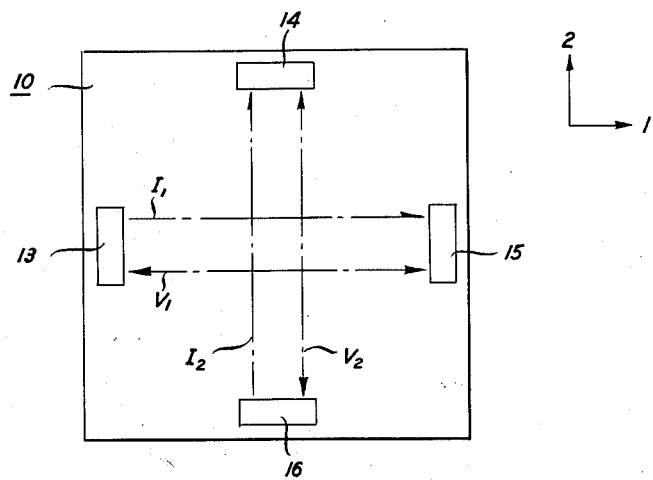
FIG. 1A is a schematic representation of the current and voltage measurements relative to the gage geometry of FIG. 1 required to calculate the two principal stresses and their orientation.

Referring again to FIG. 1 electrical leads 17–20 are attached to the respective contacts 13–16 and connected to a current source and voltmeter (not shown) so as to obtain the measurements indicated schematically in FIG. 1A. Referring to FIG. 1A, the three essential measurements are $$\Delta \frac{V_1}{I_1} \text{ with } I_2=0, \quad \Delta \frac{V_2}{I_2} \text{ with } I_1=0$$

and $$\frac{V_2}{I_1} \text{ with } I_2=0$$

From these measurements the principal stresses and strains and their orientations can be determined according to well known calculations; see, for example: Timoshenko and Goodier, Theory of Elasticity, McGraw-Hill Book Company, New York (1951), Chapter 2 Section 9.

The necessary calculations relating the piezoresistive measurements with the piezoresistive coefficients of the material so as to obtain the magnitude and direction of the principal strains are derived as follows:

The resistance change responsive to a given stress in a piezoresistive material is given by the relation:

$$\frac{\Delta \rho}{\rho_0} = \pi \sigma \tag{1}$$

where $\Delta \rho = \rho - \rho_0$ and is the resistivity change obtained from the $$\frac{V}{I}$$

measurements given above ($\rho_0$=zero stress resistance), $\pi$ is the piezoresistive coefficient and $\sigma$ is the stress.

The term $\pi$ is a fourth order tensor which relates the electric field component, the current density component and the stress component involved. Each of these components is related to the crystallographic axes of the crystal. Assuming diamond cubic, zinc blende or similar cubic structures of symmetry classes $O_h$, $T_d$ and $O$ (Hermann-Mauguin symbols $m3m$, $\bar{4}3m$ and $432$ respectively) the fundamental piezoresistive coefficients, with which the art is familiar, are $\pi_{11}$, $\pi_{12}$ and $\pi_{44}$. These include simplifications of the four components of $\pi$ according to the scheme $11 \rightarrow 1$, $22 \rightarrow 2$, $33 \rightarrow 3$, $23=32 \rightarrow 4$, $31=13 \rightarrow 5$, $12=21 \rightarrow 6$. Thus, the fundamental coefficient $\pi_{11}$ is actually $\pi_{1111}$. Using this scheme, the first subscript relates the current and the field directions to the 1, 2 or 3 cubic axis and the second subscript describes the character of the stress relative to the crystallographic axes.

When the piezoresistive measurement is taken along an arbitrary direction in the crystal (i.e. not along the 1, 2 or 3 axis) the measurement obtained can be related to these fundamental coefficients (i.e. the 1, 2 and 3 axes) as follows:

Letting primed quantities stand for the arbitrary directions chosen:

$$\pi'_{11} = \pi_{11} - 2(\pi_{11} - \pi_{12} - \pi_{44}) \tag{2}$$

$$(l_1^2 m_1^2 + l_1^2 n_1^2 + m_1^2 n_1^2)$$

where $l$, $m$, and $n$ are the direction cosines relating the current direction to the crystallographic axes, and $\pi_{11}$, $\pi_{12}$, and $\pi_{44}$ are the fundamental piezoresistance coefficients of the crystal.

The transverse piezoresistance constant, $\pi'_{12}$, is defined by an equation similar to Equation 1. However, the simple tensile stress is now normal to the current. $\pi'_{12}$ is then given by:

$$\pi'_{12} = \pi_{12} + (\pi_{11} - \pi_{12} - \pi_{44})(l_1^2 l_2^2 + m_1^2 m_2^2 + n_1^2 n_2^2) \tag{3}$$

where $l$, $m$, and $n$ are as before and $l_2$, $m_2$, and $n_2$ are the direction cosines relating the stress to the crystallographic axes.

We distinguish two kinds of shear piezoresistance constants, depending on whether the electric field and current involved are in the same direction or in mutually perpendicular directions. When the electric field and current are in the same direction, say the 1' direction, a shear stress ($\tau'_{12}$, for example) may affect the resistance through the coefficient $\pi'_{16}$. On the other hand, the same shear stress, $\tau'_{12}$, affects the ratio of the field in the 1' direction to the current density in the 2' direction through the coefficient $\pi'_{66}$. For the first kind, in which field and current are in the same direction, the first subscript will be 1, 2, or 3, while for the second kind, both subscripts will be greater than 3.

When referred to crystallographic axes in the classes of cubic symmetry $O_h$, $T_d$, and $O$, all of these shear coefficients vanish except $\pi_{66}=\pi_{44}$. However, the remaining coefficients may take on large values for other orientations. For general orientations in these crystal classes, $\pi'_{16}$ is:

$$\pi'_{16}=2\pi'_{61}=2(\pi_{11}-\pi_{12}-\pi_{44})(l_1^3 l_2+m_1^3 m_2+n_1^3 n_2) \quad (4)$$

And $\pi_{66}$ is:

$$\pi'_{66}=\pi_{44}+2(\pi_{11}-\pi_{12}-\pi_{44})[(l_1 l_2)^2+(m_1 m_2)^2+(n_1 n_2)^2] \quad (5)$$

A nonzero value of a coefficient like $\pi'_{61}$ shows that a tensile stress in the 1' direction affects the ratio of the electric field in the 1' direction to the current density in the 2' direction.

The equation for the coefficient $\pi'_{22}$ is analogous to Equation 2; $\pi'_{26}$ is analogous to $\pi'_{16}$ (Equation 4) and is equal to $2\pi'_{62}$.

These relations including Equations 2–5 relate the piezoresistive coefficient associated with any desired direction in the semiconductor to the fundamental piezoresistive coefficients associated with the cubic axes.

The relationship between the absolute stress values required to calculate the principal stresses and the IV measurements referred to above is derived as follows:

Let quantities without primes be referred to the crystallographic axes, and primed quantities to a cartesian system whose orientation is specified by the transformation matrix.

|   | 1 | 2 | 3 |
|---|---|---|---|
| 1' | $l_1$ | $m_1$ | $n_1$ |
| 2' | $l_2$ | $m_2$ | $n_2$ |
| 3' | $l_3$ | $m_3$ | $n_3$ | (6)

That is, the $x'_i$ axis has the direction cosines $l_i$, $m_i$, $n_i$ with respect to the crystallographic axes, $i=1, 2, 3$. The current density components in the crystallographic system are given by $$i_1=l_1 i'_1+l_2 i'_2+l_3 i'_3$$
$$i_2=m_1 i'_1+m_2 i'_2+m_3 i'_3 \quad (7)$$
$$i_3=n_1 i'_1+n_2 i'_2+n_3 i'_3$$

The stress components in the crystallographic system are $$\sigma_1=l_1^2\sigma'_1+l_2^2\sigma'_2+l_3^2\sigma'_3+2(l_2 l_3\tau'_{23}+l_1 l_3\tau'_{13}+l_1 l_2\tau'_{12})$$
$$\tau_{23}=m_1 n_1\sigma'_1+m_2 n_2\sigma'_2+m_3 n_3\sigma'_3+(m_2 n_3+m_3 n_2)\tau'_{23} \quad (8)$$
$$+(m_1 n_3+m_3 n_1)\tau'_{13}+(m_1 n_2+m_2 n_1)\tau'_{12}$$

where $\sigma'_1$, $\sigma'_2$, $\sigma'_3$, $\tau_{12}$, $\tau_{13}$ and $\tau_{23}$ are the stress and shear components, respectively. The equations for $\sigma_2$ and $\sigma_3$ are of the same form as the first of this pair, and those for $\tau_{13}$ and $\tau_{12}$ are of the same form as the second. The electric field components in the rotated system are given by equations like the inverses of (7):

$$E'_1=l_1 E_1+m_1 E_2+n_1 E_3$$
$$E'_2=l_2 E_1+m_2 E_2+n_2 E_3 \quad (9)$$
$$E'_3=l_3 E_1+m_3 E_2+n_3 E_3$$

Now the piezoresistance equations, referred to crystallographic axes are:

$$\frac{E_1}{\rho_0}=i_1[1+\pi_{11}\sigma_1+\pi_{12}(\sigma_2+\sigma_3)]+\pi_{44}(i_2\tau_{12}+i_3\tau_{13})$$

$$\frac{E_2}{\rho_0}=i_2[1+\pi_{11}\sigma_2+\pi_{12}(\sigma_1+\sigma_3)]+\pi_{44}(i_1\tau_{12}+i_3\tau_{23})$$

$$\frac{E_3}{\rho_0}=i_3[1+\pi_{11}\sigma_3+\pi_{12}(\sigma_1+\sigma_2)]+\pi_{44}(i_1\tau_{13}+i_2\tau_{23})$$

(10)

By substituting (7) and (8) into (10) and the resulting expressions for $E_1$, $E_2$, and $E_3$ into (9), we obtain equations of the form:

$$\frac{E'_1}{\rho_0}=i'_1(1+\pi'_{11}\sigma'_1+\pi'_{12}\sigma'_2+\pi'_{13}\sigma'_3+\pi'_{14}\tau'_{23}+\pi'_{15}\tau'_{13}$$
$$+\pi'_{16}\tau'_{12})+i'_2(\pi'_{61}\sigma'_1+\pi'_{62}\sigma'_2+\pi'_{63}\sigma'_3+\pi'_{64}\tau'_{23}$$
$$+\pi'_{65}\tau'_{13}+\pi'_{66}\tau'_{12})+i'_3(\pi'_{51}\sigma'_1+\pi'_{52}\sigma'_2+\pi'_{53}\sigma'_3$$
$$+\pi'_{54}\tau'_{23}+\pi'_{55}\tau'_{13}+\pi'_{56}\tau'_{12})$$

$$\frac{E'_2}{\rho_0}=i'_1(\pi'_{61}\sigma'_1+\pi'_{62}\sigma'_2+\pi'_{63}\sigma'_3+\pi'_{64}\tau'_{23}+\pi'_{65}\tau'_{13}+\pi'_{66}\tau'_{12})$$
$$+i'_2(1+\pi'_{21}\sigma'_1+\pi'_{22}\sigma'_2+\pi'_{23}\sigma'_3+\pi'_{24}\tau'_{23}+\pi'_{25}\tau'_{13}+\pi'_{26}\tau'_{12})$$
$$+i'_3(\pi'_{41}\sigma'_1+\pi'_{42}\sigma'_2+\pi'_{43}\sigma'_3+\pi'_{44}\tau'_{23}+\pi'_{45}\tau'_{13}+\pi'_{46}\tau'_{12})$$

$$\frac{E'_3}{\rho_0}=i'_1(\pi'_{51}\sigma'_1+\pi'_{52}\sigma'_2+\pi'_{53}\sigma'_3+\pi'_{54}\tau'_{23}+\pi'_{55}\tau'_{13}+\pi'_{56}\tau'_{12})$$
$$+i'_2(\pi'_{41}\sigma'_1+\pi'_{42}\sigma'_2+\pi'_{43}\sigma'_3+\pi'_{44}\tau'_{23}+\pi'_{45}\tau'_{13}+\pi'_{46}\tau'_{12})$$
$$+i'_3(1+\pi'_{31}\sigma'_1+\pi'_{32}\sigma'_2+\pi'_{33}\sigma'_3+\pi'_{34}\tau'_{23}+\pi'_{35}\tau'_{13}+\pi'_{36}\tau'_{12})$$

(11)

For a plane gage as in FIG. 1 with two dimensional strains (1 and 2 directions) Equation 11 reduces to:

$$\left(\frac{E'_1}{\rho_0 i'_{1_{i'_2=0}}}\right)=1+\pi'_{11}\sigma'_1+\pi'_{12}\sigma'_2+\pi'_{16}\tau'_{12}$$

$$\left(\frac{E'_2}{\rho_0 i'_{2_{i'_1=0}}}\right)=1+\pi'_{21}\sigma'_1+\pi'_{22}\sigma'_2+\pi'_{26}\tau'_{12}$$

$$\left(\frac{E'_2}{\rho_0 i'_{1_{i'_2=0}}}\right)=\pi'_{61}\sigma'_1+\pi'_{62}\sigma'_2+\pi'_{66}\tau'_{12} \quad (12)$$

Note that the measurements for the left hand quantities in each of these equations correspond to those measurements referred to in considering FIG. 1B, and which the gage embodiment of this invention are designed to provide.

By obtaining the designated measurements, calculating the required $\pi'$ coefficients from Equations 2 through 5, and substituting in Equation 12, a simultaneous solution for $\sigma'_1$, $\sigma'_2$, and $\tau'_{12}$ gives the three required unknown values for the biaxial stress determination.

It will be recognized that Equation 12 does not necessarily have a solution, depending upon the values of the $\pi'$ coefficients. For a solution to exist the determinant of the $\pi'$ values in Equation 12 must be nonzero. For the purposes of this invention, a preferred absolute value for the determinant:

$$\begin{vmatrix} \pi'_{11} & \pi'_{12} & \pi'_{16} \\ \pi'_{21} & \pi'_{22} & \pi'_{26} \\ \pi'_{61} & \pi'_{62} & \pi'_{66} \end{vmatrix} \quad (13)$$

must exceed $\pm\sim 2\times 10^{-33}$ cm.$^6$/dyne$^3$.

As is apparent, the directions 1 and 2 are the corresponding directions of FIG. 1A. The following example give a specific material providing fundamental coefficients which are particularly well adapted to this invention.

EXAMPLE I

A gage constructed of n-type germanium according to the geometry of FIG. 1 with the plane of the gage being (11$\bar{2}$), direction 1 being [111], direction 2 being [1$\bar{1}$0], having a resistivity ($\rho_0$) of 15 ohm-cm. at room temperature, has the following fundamental piezoresistive coefficients:

$$\pi_{11} = -2.3 \times 10^{-12} \text{ cm.}^2/\text{dyne}$$

$$\pi_{12} = -3.2 \times 10^{-12} \text{ cm.}^2/\text{dyne}$$

$$\pi_{44} = -138.1 \times 10^{-12} \text{ cm.}^2/\text{dyne}$$

Using these values in Equations 2 through 5 the following approximate values of the coefficients, in units of $10^{-12}$ cm.$^2$/dyne, are obtained:

$$\pi'_{11} = -95$$

$$\pi'_{12} = \pi'_{21} = +43$$

$$\pi'_{16} = \pi'_{26} = \pi'_{61} = \pi'_{62} = 0$$

$$\pi'_{22} = -72$$

$$\pi'_{66} = -45$$

The determinant 13 of these coefficients is calculated with a result of $-225 \times 10^{-33}$ which satisfies the limitation that absolute value of the determinant exceeds $1 \times 10^{-33}$.

It is understood that any gage adapted to provide the measurements of current and field referred to above along crystallographic directions providing piezoresistive coefficients satisfying the limitation on Equation 13 are within the scope of this invention.

As is seen from Example I, a large $\pi_{44}$ coefficient is generally desirable. For certain semiconductors the value of $\pi_{44}$ is small zero. However, the same semiconductor having a different conductivity type may have the desired large value of $\pi_{44}$. For instance, Table I gives the fundamental piezoresistive coefficients for silicon of the indicated resistivity:

Table I n-TYPE, RESISTIVITY 12 OHM-CM.

$$\pi_{11} \cong -102.10^{-12} \text{ cm.}^2/\text{dyne}$$

$$\pi_{12} \cong +53.10^{-12} \text{ cm.}^2/\text{dyne}$$

$$\pi_{44} \cong -13.6 \times 10^{-12} \text{ cm.}^2/\text{dyne}$$

p-TYPE, RESISTIVITY 8 OHM-CM.

$$\pi_{11} \cong +6.6 \times 10^{-12} \text{ cm.}^2/\text{dyne}$$

$$\pi_{12} \cong -1.1 \times 10^{-12} \text{ cm.}^2/\text{dyne}$$

$$\pi_{44} \cong +138.10^{-12} \text{ cm.}^2/\text{dyne}$$

Although the value of $\pi_{44}$ for n-silicon quoted above is relatively small, a gage of n-silicon of this resistivity aligned with the cubic axes, will have a value of about $7 \times 10^{-33}$ for determinant of Equation 13, which is above the limitation of $\sim 2 \times 10^{-33}$. However, a very effective approach to obtaining desirable coefficients which result in a much larger value of the determinant of Equation 13 is to use a heterogeneous semiconductor for the gage material. For instance, an n-type layer diffused into the top surface of a flat p-type wafer of silicon with each of the four electrodes connecting both layers in parallel and having one opposing electrode pair along [010] and the remaining electrode pair along [100] (these directions being normal to each other) results in a highly desirable gage providing the unexpected advantages of this invention.

Figure 2A:
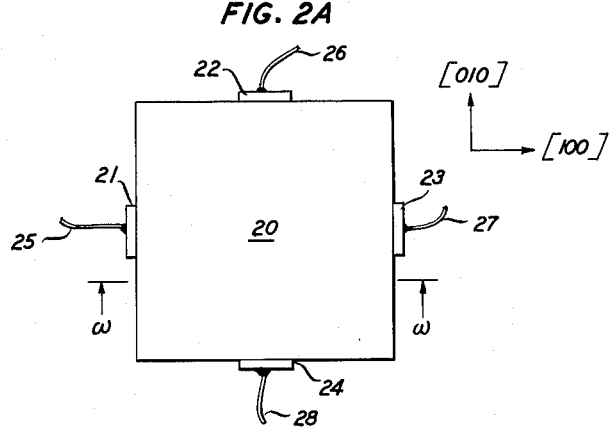
FIG. 2A is a plan view of another embodiment constructed according to this invention.
Figure 2B:
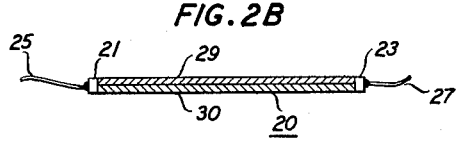
FIG. 2B is a front section through plane $\omega$—$\omega$ of FIG. 2A.

A heterogeneous gage construction is shown in FIGS. 2A and 2B. The plan view, FIG. 2A, shows the wafer 20 and the positions of electrodes 21-24 and leads 25-28 much like the configuration of FIG. 1. The crystallographic directions shown in FIG. 2A are appropriate for n-type and p-type silicon having resistivities of approximately 0.1 to 10 ohm-cm.

FIG. 2B, a front section taken through $\omega$—$\omega$ of FIG. 2A, shows the bimorph character of this gage. The upper layer 29 is n-type silicon, the lower layer 30 is p-type silicon. Note that the contacts 21 and 23 connect both layers.

The overall piezoresistive coefficients for this gage are easily calculated from the fundamental coefficients of each layer (Table I) and the fraction of current flowing through each layer. Thus, assume $f$ is the fraction of current in the p-type layer, a quantity readily obtained from the relative resistances of the layers (as in a parallel circuit) and the total current. The coefficient $\pi'_{11}*$, the heterogeneous coefficient, is calculated by:

$$\pi'_{11}* = f[\pi'_{11}(p)] + (1-f)[\pi'_{11}(n)] \quad (14)$$

and similarly for heterogeneous coefficients $\pi'_{12}*$ and $\pi'_{44}*$.

For example, letting $f=0.8$ in Equation 14 and using the $\pi$ values of Table I for n- and p-silicon, a two layer gage aligned with the cubic axes will have a determinant value of about $120 \times 10^{-33}$. This is well in excess of the determinant value of $7.10^{-33}$ obtained previously with the n-type silicon alone.

Alternatively, the p-type layer could be diffused through the wafer at its center thereby providing a heterogeneous gage in which the currents between both pairs of opposing contacts flow first through n-type material then through p-type (at the center) then again, through n-type material. The $\pi'*$ coefficients are then calculated according to the ratio of relative resistances of the two conductivity types along the current path.

For the purposes of this invention where the active gage medium is defined in terms of the critical value of the determinant of the piezoresistive coefficients in arbitrarily defined directions, this definition is intended to cover both homogeneous and heterogeneous materials. In some instances it may be found desirable to combine different semiconductors rather than merely combining conductivity types of the same semiconductor.

Figure 3:
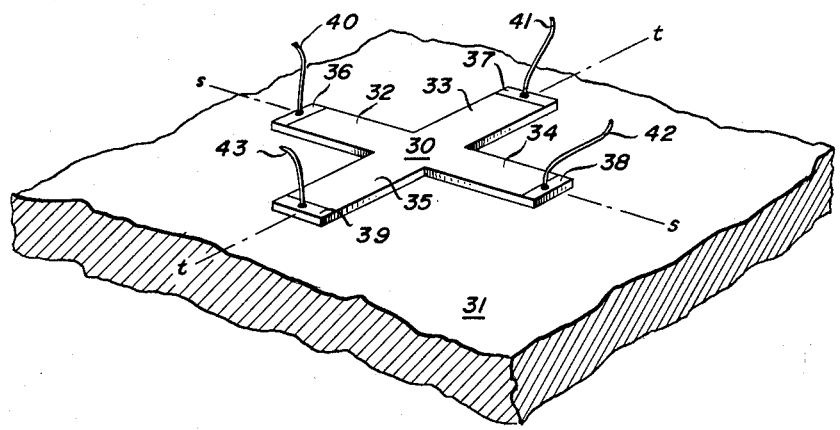
FIG. 3 is a perspective view of a further modification of the basic gage form of FIG. 1 utilizing a composite semiconductor wafer to obtain optimum values of the desired piezoresistive coefficients.

FIG. 3 illustrates a further embodiment of this invention which insures proper current flow lines by virtue of the geometry of the allowable flow path. The gage 30 is affixed to member 31 by appropriate means (not shown) such as Allen PBX cement. Each of arms 32—31 represents a restricted current flow path between electrodes 36—39. Attached to each of electrodes 36—39 are leads 40—43 which are connected to a current source and voltage measuring device (not shown) so as to obtain the same measurements previously prescribed in connection with FIG. 1A. Again center lines $s$—$s$ and $t$—$t$ connecting opposing pairs of electrodes are essentially normal to each other and should not depart more than ten degrees from perpendicular. With a gage in the form of that of FIG. 1, the ratio $a$ to $b$ is restricted to preclude excessive spreading of the current flow lines thereby insuring the effectiveness of the piezoresistive measurement. The gage design of FIG. 3 specifically avoids undue spreading of current between the electrodes by restricting the current flow path. With such a construction the arms 32—35 may be as long as desired relative to the projected width of the contact (dimension $a$ in FIG. 1) without introducing difficulties from the character of the current flow.

Any of the aforementioned gage configurations may be constructed according to many known fabricating techniques. Whereas, for illustrative purposes, the construction shown in the figures assumes a wafer in the designated pattern glued to the test member, various other procedures are available, some of which show particular advantages. A preferred method of forming the gage configurations of this invention is by mask diffusion techniques which are fully treated in W. G. Pfann, Serial No. 96,463, filed March 17, 1961. These constructions eliminate edge effects and insure a faithful transfer of the strain in the test member to the active gage arms.

A further preferred method of forming the configurations of this invention is by epitaxy or evaporation using masking techniques which are well established in the art.

A particular epitaxial procedure may be found in United States Patent No. 2,692,839.

Whereas single crystal semiconductor gages are generally preferred, polycrystalline bodies are suitable and effective. The use of polycrystalline gages allows for fabrication by simple evaporation.

In the foregoing description, the references to $\pi$ coefficients involved absolute crystallographic (cubic) directions (1, 2 and 3). However, $\pi'$ coefficients referred to any arbitrary direction in the material along which the required piezoresistive measurements may be taken. Accordingly, these latter coefficients dictate the piezoresistive response in any direction of measurement and are related to the fundamental coefficients (by Equations 2 through 5) only for convenience in evaluating the $\pi'$ coefficients from known data. Equation 13 and the limitation on its determinant is valid for every crystal system although the equations relating the $\pi'$ values to the fundamental coefficients may depart from Equations 2 through 5.

Various other configurations and modifications utilizing the principles set forth herein will become apparent to those skilled in the art. However, all such variations or deviations which basically employ the novel concepts through which this invention has advanced the art are considered to be within the scope of this invention.

What is claimed is:

1. A piezoresistive semiconductor strain gage comprising an essentially flat wafer of a piezoresistive semiconductor material having a thickness of less than one-tenth of the minimum planar dimension, said wafer additionally having two pairs of electrical contacts spaced over a flat surface thereof, said contacts disposed such that imaginary lines connecting the centers of each pair of contacts intersect within 10 degrees of normal, said imaginary lines representing directions in the material which have piezoresistive coefficients associated therewith which in the determinant:

$$\begin{vmatrix} \pi'_{11} & \pi'_{12} & \pi'_{16} \\ \pi'_{21} & \pi'_{22} & \pi'_{26} \\ \pi'_{61} & \pi'_{62} & \pi'_{66} \end{vmatrix}$$

have a nonzero value, the 1 and 2 crystallographic directions interrelating said coefficients corresponding with the directions of said imaginary lines.

2. The gage of claim 1 wherein each contact further has a ratio of its projected width in the direction of its associated imaginary line to the distance separating the leading edges of the contact pair within the range 1:2 to 1:20.

3. The gage of claim 2 wherein the said ratio is 1:3.

4. The gage of claim 1 wherein the said imaginary lines are normal to one another.

5. The gage of claim 1 wherein the wafer is in the form of a cross, each arm of which carries one of said contacts.

6. The gage of claim 1 wherein the wafer is a semiconductor selected from the group consisting of germanium and silicon.

7. The gage of claim 1 wherein the wafer is n-silicon.

8. The gage of claim 1 wherein the wafer is a composite silicon bimorph having an n-type region and a p-type region successively across the thickness of the wafer.

9. The gage of claim 1 wherein the value of said determinant exceeds $\pm 2 \times 10^{-33}$ cm.$^6$/dyne$^3$.

References Cited in the file of this patent

UNITED STATES PATENTS

| | | |
|---|---|---|
| 1,907,427 | Marrison | May 9, 1933 |
| 2,047,252 | Bloomenthal | July 14, 1936 |
| 2,318,102 | Ruge | May 4, 1943 |
| 2,407,251 | Christensen | Sept. 10, 1946 |
| 2,558,563 | Janssen | June 26, 1951 |
| 2,692,839 | Christensen et al. | Oct. 26, 1954 |
| 2,790,037 | Shockley | Apr. 23, 1957 |

OTHER REFERENCES

Forst et al.: S.E.S.A. Proceedings, vol. XVII, No. 1, 1960, Applications of Semiconductor Transducers in Strain Gages and Rigid Dynamometers (pp. 142–148, pp. 143–146 relied upon).